(12) United States Patent
Karavolos (10) Patent No.: US 10,279,312 B2
(45) Date of Patent: May 7, 2019

(54) ELECTRONIC COMPONENT AND MATERIAL FOR SUSTAINABLE REMOVAL OF WASTE PRODUCTS AND GENERATION OF CONSUMABLES

(71) Applicant: Angelo Karavolos, Spring, TX (US)

(72) Inventor: Angelo Karavolos, Spring, TX (US)

( * ) Notice: Subject to any disclaimer, the term of this patent is extended or adjusted under 35 U.S.C. 154(b) by 0 days.

(21) Appl. No.: 15/062,187

(22) Filed: Mar. 6, 2016

(65) Prior Publication Data
US 2018/0028969 A1 Feb. 1, 2018

(51) Int. Cl.
| | |
|---|---|
| *B01D 53/22* | (2006.01) |
| *B01D 53/80* | (2006.01) |
| *B01D 53/96* | (2006.01) |
| *B01D 53/75* | (2006.01) |
| *C01B 32/05* | (2017.01) |
| *C01B 13/02* | (2006.01) |
| *B01D 53/62* | (2006.01) |
| *B01D 53/32* | (2006.01) |

(52) U.S. Cl.
CPC ........... *B01D 53/80* (2013.01); *B01D 53/226* (2013.01); *B01D 53/229* (2013.01); *B01D 53/32* (2013.01); *B01D 53/62* (2013.01); *B01D 53/75* (2013.01); *B01D 53/96* (2013.01); *C01B 13/0203* (2013.01); *C01B 32/05* (2017.08); *B01D 2251/512* (2013.01); *B01D 2253/106* (2013.01); *B01D 2257/504* (2013.01); *Y02C 10/04* (2013.01); *Y02C 10/10* (2013.01); *Y02P 20/152* (2015.11)

(58) Field of Classification Search
CPC .... B01D 53/229; B01D 53/226; B01D 53/80; B01D 2257/504; B01D 2251/512; B01D 53/75; B01D 53/96; B01D 53/62; C01B 13/0203; C01B 32/05
See application file for complete search history.

(56) References Cited

U.S. PATENT DOCUMENTS

| | | | | |
|---|---|---|---|---|
| 4,085,193 A | * | 4/1978 | Nakajima | B01D 53/9418 423/239.1 |
| 4,391,912 A | * | 7/1983 | Yoshida | C12M 29/16 435/297.4 |
| 4,689,122 A | * | 8/1987 | Polak | G01N 27/4074 204/421 |
| 5,919,725 A | * | 7/1999 | Soled | B01J 27/188 502/210 |
| 9,533,254 B2 | * | 1/2017 | McGrath | |
| 2002/0160238 A1 | * | 10/2002 | Labinov | F02C 3/28 48/127.9 |
| 2008/0141672 A1 | * | 6/2008 | Shah | B01D 53/75 60/648 |

(Continued)

*Primary Examiner* — Anthony R Shumate (57) ABSTRACT

Removing waste gas, more particularly carbon dioxide, from a gaseous medium and producing gaseous oxygen, a recovered waste constituent, more particularly solid carbon, heat and electrical power, by means of chemical reaction of waste gas with a metal oxide, more particularly dodecatungstophosphoric acid, immobilized in a porous matrix, more particularly tetraethylorthosilicate sol gel, enclosed in a gas permeable membrane. Regeneration of the metal oxide, more particularly by heating, and reconstitution of the porous matrix containing same by periodic introduction of base materials, and in some cases with externally supplied energy.

7 Claims, 6 Drawing Sheets

(56) References Cited

U.S. PATENT DOCUMENTS

| | | | |
|---|---|---|---|
| 2010/0075184 A1* | 3/2010 | Chen | H01M 8/0668 429/408 |
| 2010/0239625 A1* | 9/2010 | Puckett | A41D 13/1115 424/402 |
| 2010/0330436 A1* | 12/2010 | Ryou | H01M 2/0222 429/405 |
| 2013/0266887 A1* | 10/2013 | Norimoto | H01M 8/1004 429/480 |
| 2015/0122121 A1* | 5/2015 | McGrath | B01D 53/228 95/45 |
| 2015/0226118 A1* | 8/2015 | Kelly | F02C 3/22 290/52 |
| 2017/0247803 A1* | 8/2017 | Sofranko | C25B 5/00 |

* cited by examiner

ELECTRONIC COMPONENT AND MATERIAL FOR SUSTAINABLE REMOVAL OF WASTE PRODUCTS AND GENERATION OF CONSUMABLES

BENEFIT OF PRIOR APPLICATION IS CLAIMED

This application claims the benefit of prior provisional application 62/129,267, filed 6 Mar. 2015, the entirety of which is incorporated herein by reference.

BACKGROUND OF THE INVENTION

1. Field of the Invention

The present invention relates generally to the field of greenhouse gas mitigation, more specifically to the use of a metal oxide-containing compound to reduce a waste gas from an oxidized state, especially of the use of dodecatungstophosphoric acid to assist in the production of oxygen using carbon dioxide to lower material pH, so that oxygen can be released by the metal complex, dissolved in the matrix, and released by de-pressurization.

2. General Background and State of the Art

Various methods have been developed for removing waste products and producing consumable products from them. Areas of application include aerospace, space flight and undersea operations. These methods tend to involve toxic materials and complex equipment.

INVENTION SUMMARY

It is an object of the present invention to provide a device and method for removing contaminants from a fluid stream and concurrently providing consumables using sustainable chemical and physical processes.

In accordance with these objects and with others which will be described and which will become apparent, an exemplary embodiment of the contaminant removal-consumables resupply device in accordance with the present invention comprises at least three geometries and multiple chemistries in order to sustainably remove contaminants from the surrounding environment and supply oxygen, water, heat and electrical energy.

In an exemplary embodiment a 10 cm by 10 cm by 2 cm enclosed container with several inserts for screens containing several capture agents for carbon dioxide, sulfur dioxide, nitrogen dioxide, and other selected and desired gas contaminants, and gelatinous or sol gel and water bonded materials, metal oxides, and optionally metabolizing bacteria with nutrient thickened agent.

Also in accordance with these objects and with others which will be described and which will become apparent, an exemplary embodiment of the device with cylindrical geometries in accordance with the present invention comprises a 10 cm in height, 5 cm in diameter, with an exterior wall 3 mm thick, capable of removing 100 grams of carbon dioxide per day, producing 80 grams of oxygen per day, 0.1 mA of current, and 1.0 kJ of heat per day.

In an exemplary embodiment, a device with a plate 1 meter by 1 meter by 3 mm and a second plate of the same dimensions, containing the dielectric material within, capable of removing up to 1 kg of carbon dioxide and producing up to 600 grams of oxygen per day, 1 mA of current, and 1.0 kJ of heat per day.

An exemplary embodiment, a device with a spherical series of shells, each 1-2 mm thick, contains, a layer of semipermeable membrane, a secondary layer comprising a sol gel or gelatinous material containing metal oxide and contaminant capture agent, overlaying a second semipermeable membrane.

Each embodiment contains a small percentage of metal oxide, whose amount is proportional to the amount of oxygen to be released, the same metal oxide in proportion to the amount of carbon dioxide removed from the fluid, and a suitable amount of silicate or gelatin, with suitable surface area to contain the metal oxide. In another embodiment, the dielectric material within contains bacterial organisms and nutrients sufficient to sustain a culture for carbon dioxide removal and oxygen resupply. In this particular embodiment, the capacitor becomes a "living capacitor" or "capacitor chamber" where a small ecosystem is created. Minerals and buffer solution, salts, and a recycling material such as a cell wall lysing agent are added in small amounts as dictated by material balance, so that minerals can be replaced into the system.

BRIEF DESCRIPTION OF THE DRAWINGS

For a further understanding of the objects and advantages of the present invention, reference should be had to the following detailed description, taken in conjunction with the accompanying drawing, in which like parts are given like reference numbers and wherein.

A FOURTH EXEMPLARY EMBODIMENT, FIG. 3 and FIG. 4 provide chemical and physical detail.

DETAILED DESCRIPTION OF THE PREFERRED EMBODIMENTS

Figure 1:
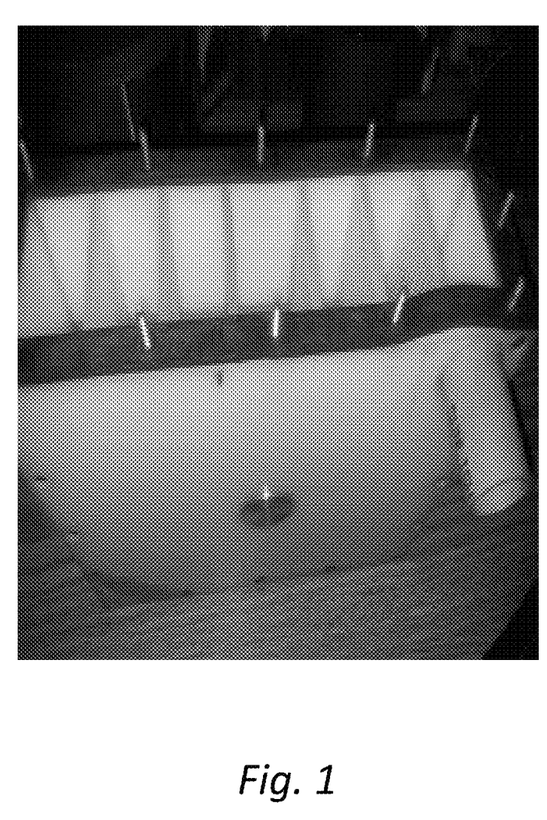
FIG. 1 is a perspective view of A FIRST EXEMPLARY EMBODIMENT of the APPARATUS in accordance with the present invention.

FIG. 1 shows A FIRST EXEMPLARY EMBODIMENT of the APPARATUS as a 10 cm by 10 cm by 2 cm enclosed container with several inserts for screens containing several capture agents for carbon dioxide, sulfur dioxide, nitrogen dioxide, and other selected and desired gas contaminants, and gelatinous or sol gel and water bonded materials, metal oxides, and optionally metabolizing bacteria.

In a larger SECOND EXEMPLARY EMBODIMENT of the APPARATUS, a device with a plate 1 meter by 1 meter by 3 mm and a second plate of the same dimensions, containing the dielectric material within, capable of removing up to 1 kg of carbon dioxide per day, producing 600 grams of oxygen per day, producing 1 mA of current, and producing 1.0 kJ of heat per day.

Figure 2:
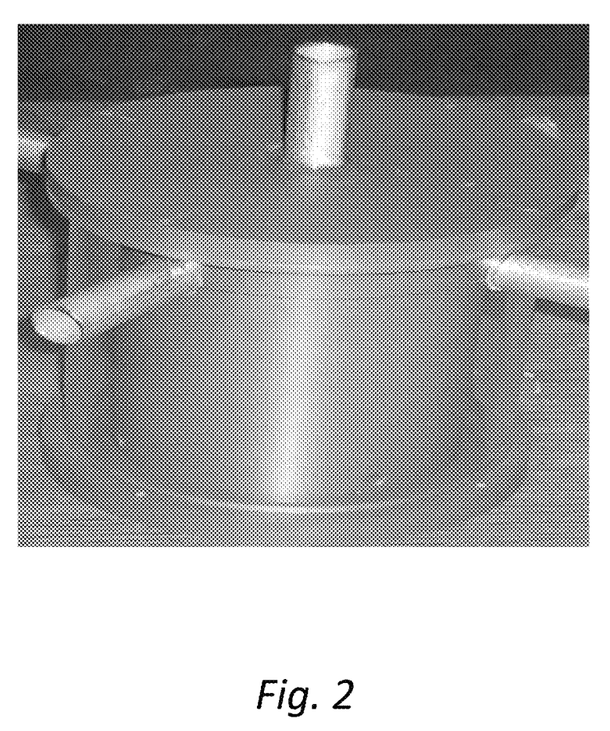
FIG. 2 is a side perspective view of A THIRD EXEMPLARY EMBODIMENT of the APPARATUS.

FIG. 2 shows THIRD EXEMPLARY EMBODIMENT of the APPARATUS with cylindrical geometries in accordance with the present invention standing 10 cm in height, 5 cm in diameter, with an exterior wall 3 mm thick, capable of removing 100 grams of carbon dioxide per day, producing 80 grams of oxygen per day, 0.1 mA of current, and 1.0 kJ of heat per day.

Another, fourth exemplary embodiment, a device with a spherical series of shells, each 1-2 mm thick, containing, for example, a layer of semipermeable membrane, a secondary layer comprising a sol gel or gelatinous material containing metal oxide and contaminant capture agent and optional biological material and nutrient supply overlaying a second semipermeable membrane.

Each of the aforementioned embodiments contains a small percentage of metal oxide, whose amount is proportional to the amount of oxygen to be released, the gelatin or biological material in proportion to the amount of carbon dioxide removed from the fluid, and a suitable amount of silicate or gelatin, with suitable surface area to contain the metal oxide.

Figure 3:
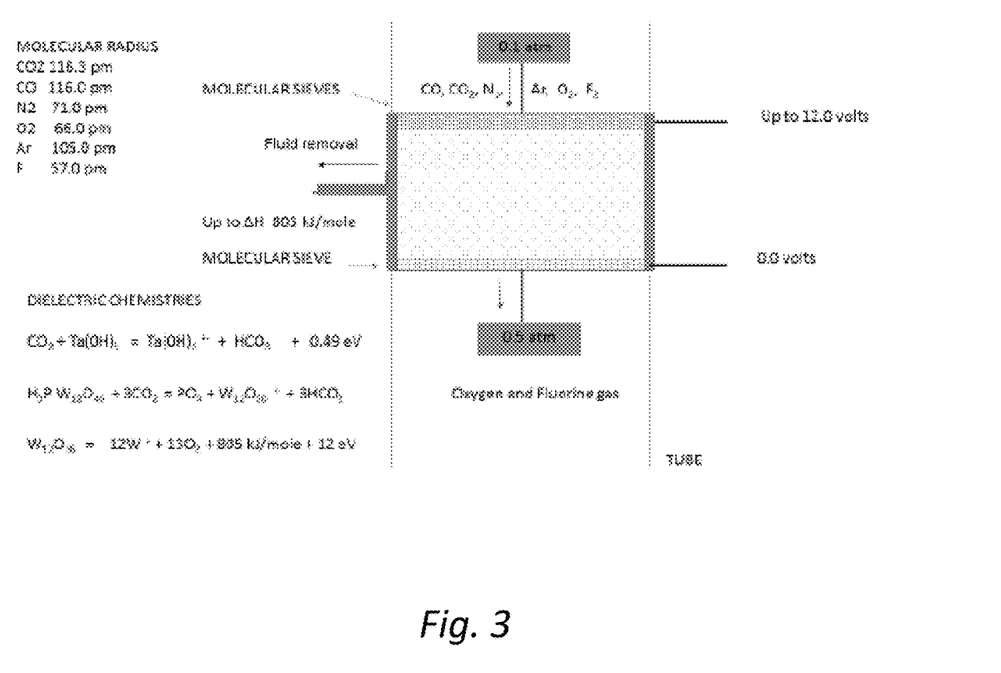
Figure 4:
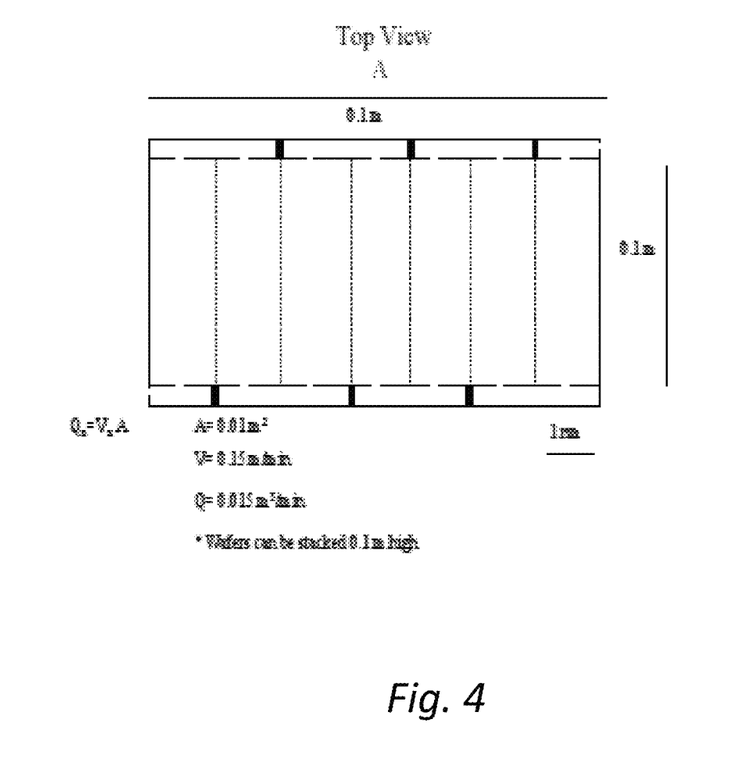

FIG. 3 and FIG. 4 provide stoichiometry and other physical characteristics of the First through Fourth Embodiments.

In yet another embodiment, the dielectric material within can contain bacterial organisms and nutrients sufficient to sustain a culture for carbon dioxide removal, and oxygen resupply.

Figure 5:
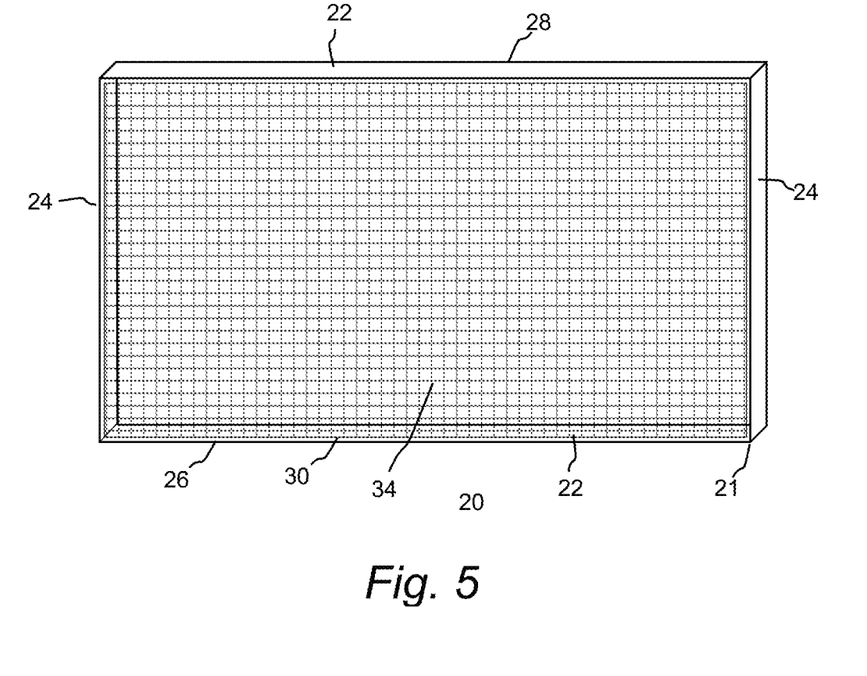
FIG. 5 shows A FIFTH EXEMPLARY EMBODIMENT of the APPARATUS in accordance with the present invention.

The invention will now also be described with reference to FIG. 5, which illustrates in perspective view A FIFTH EXEMPLARY EMBODIMENT of the APPARATUS for mitigating carbon dioxide emission of a carbon dioxide-producing activity in accordance with the present invention, shown generally at 20. A rectangular frame 21 has spaced-apart opposing first and second sides 22, spaced-apart opposing first and second ends 24, and spaced-apart opposing first edge 26 and second edge 28. A first membrane 30 sealingly contacts the first edge and spans the frame from side to side and from end to end. The first membrane is permeable to carbon dioxide. Likewise, a second membrane (not drawn; reference number 32 reserved) sealingly contacts the second edge and spans the frame from side to side and from end to end. The second membrane is permeable to oxygen. A webbing 34 (represented by a grid pattern in the drawing figure) is disposed in the frame between the first membrane and the second membrane. A porous matrix (not drawn; reference number 36 reserved) adheres to the webbing. The matrix contains water and is permeable to water and to gases dissolved therein and to gases diffusing through the first membrane. An active material is included in the matrix. The active material is capable of reacting with carbon dioxide, lowering the pH and dissolving oxygen and carbon in the process. Oxygen out-gasses across at least one of the first membrane and the second membrane, The first membrane and the second membrane are capable of physically confining the matrix, should it adhere so weakly to the webbing that it might tend to fall away.

The frame is about 7 cm side to side and 22 cm end to end and has edges spaced apart about 1 cm. The frame is formed of materials such as polystyrene, polypropylene, materials with sufficient strength to protect the membranes.

The first membrane is substantially planar and rectangular with edges, has an area of about 1 m$^2$ and a thickness of about 0.25 mm, and is formed of one material for this exemplary embodiment having a density of from approximately 0.5 g/cc to approximately 1.2 g/cc.

The second membrane is substantially identical to the first membrane in structure and composition, except that the pore spaces of the second membrane are smaller than those of the first membrane, so as to allow the exit of nitrogen and oxygen only.

The webbing is substantially screen-like, with structural members 1-2 mm thick forming rectangular channels about 4 mm by 4 mm occupying the space enclosed by the frame between the first membrane and the second membrane. The webbing is formed of polypropylene.

The matrix clings to the webbing and substantially fills the channels of the webbing between the first membrane and the second membrane. The matrix comprises tetraethylorthosilicate (TEOS) sol gel containing 5% water. TEOS sol gel is prepared as a silicon based colloid suspension. Silicon material SiOCH3 is hydrolyzed to produce methanol and SiOH. SiOH is allowed to condense, forming a bond between Si atoms. The silicon is allowed to condense using an alcohol group (methoxysilanol) to form a silicon aerogel.

The active material comprises dodeca tungsto phosphoric acid, which accounts for about 1 percent of the 2280 grams of the dielectric matrix material. About 10 percent by total weight dielectric material of dodecatungstophosphoric acid nanoparticle is added to the sol gel material along with about 10-15 percent water by total weight of the dielectric material, in order to sustain the effectiveness of the material. These materials are mixed gently at a low speed, suggested to be 10-100 rpm, using a household blender for 30 seconds. A very low rpm should be used, because, if heat builds up too quickly, the material will be destroyed.

In one exemplary mode of operation, a carbon dioxide-rich waste gas stream is supplied to the first membrane and to the second membrane, diffuses into the matrix, and reacts with the active material, producing oxygen gas which diffuses out through the first membrane and second membrane, changing the pH and conductivity, with the net effect being to reduce the carbon dioxide content of the waste gas stream and to increase its oxygen content.

Figure 6:
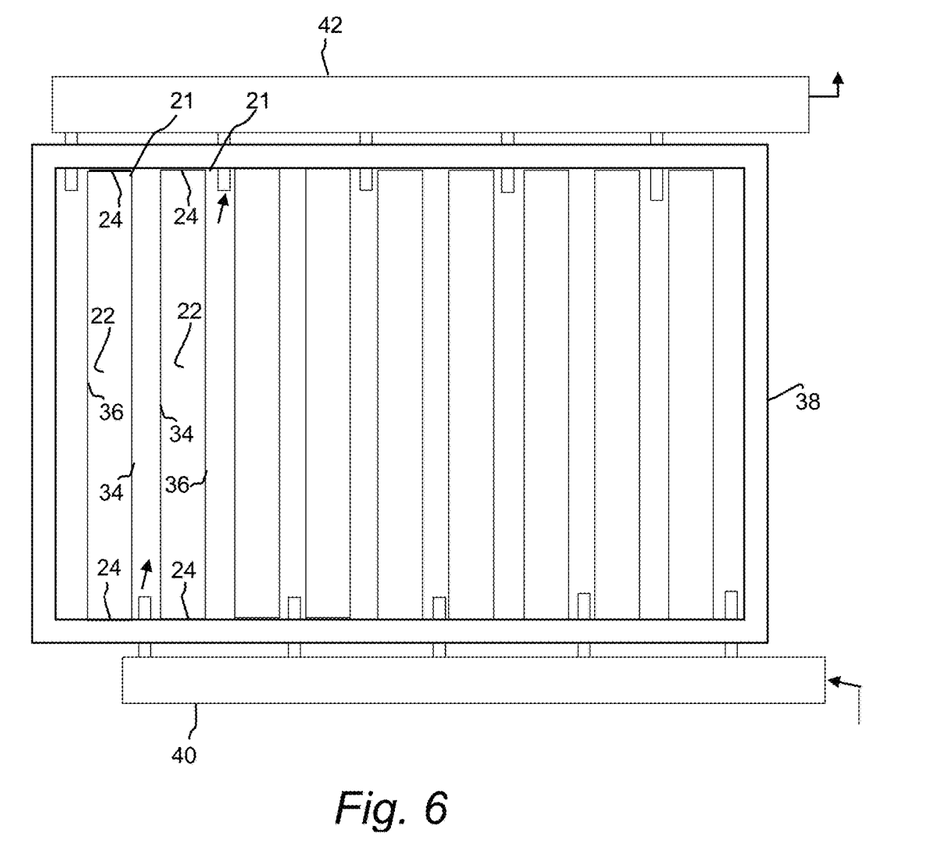
FIG. 6 shows A SIXTH EXEMPLARY EMBODIMENT of the APPARATUS in accordance with the present invention.

FIG. 5 shows A SIXTH EXEMPLARY EMBODIMENT of the APPARATUS for mitigating carbon dioxide emission of a carbon dioxide-producing activity in accordance with the present invention an exemplary embodiment constructed with multiple frames 21 as set forth in FIG. 1, arranged serially in a housing 38 penetrated by a first manifold 40 fluidly communicating with the first membranes of all frames and by a second manifold 42 fluidly communicating with the second membranes of all frames. Carbon dioxide gas is supplied at mild positive pressure in a waste gas via the first manifold. Oxygen gas is removed at mild negative pressure via the second manifold. Thus, an oxygen-enriched gas stream is collected via the second manifold and kept separate from the waste gas stream, rather than the oxygen being returned to the waste gas stream.

In a variation upon the FIRST and SECOND EXEMPLARY EMBODIMENTS of the APPARATUS, the frame and the webbing are electrically insulating and the first membrane and the second membrane are electrically conductive and are electrically connected to respective first and second poles of an electric circuit for removing electrical energy from the apparatus. The first edge and the second edge are coated with an electrically conducting material in order to establish electrical contact between the first membrane and the first pole and between the second membrane and the second pole.

In another variation, the matrix comprises an aerogel, low viscosity polymer, metal oxide, or clay mineral.

In another variation, the first membrane, second membrane, or both membranes comprises a zeolite, clay mineral, amorphous polymer, or aggregate metal granules.

In one particular variation, as discussed above, the active material comprises dodeca tungsto phosphoric acid. However, other active materials may be used. Examples include:

living cyanobacteria for oxygen production, carbon dioxide capturing enzymes such as RuBisCo, carbonic anhydrase or phosphoenolpyruvate carboxykinase—for living capacitor designs, tungsten tri oxide (+6), tantalum pentoxide (+5), vanadium (+5), pentoxide or rhenium oxide (+7). Each one of these examples are suitable for specific applications. Rhenium is particularly useful for fuel and "molecular scale sudden releases of energy." Tungsten and Tantalum are useful for applications involving cyanobacteria metabolisms or human metabolisms, respectfully. Vanadium is useful for minor applications where sulfuric acid is needed.

In an industrial variation on the FIFTH EXEMPLARY EMBODIMENT of the APPARATUS, a waste gas stack has a diameter of one meter and a height of 30 meters emits 1 metric ton of carbon dioxide per day. With the assumption that the apparatus operates in accordance with the chemistry disclosed herein at an efficiency level of 0.987, carbon dioxide is captured at a rate of 0.00017 kg per min or 0.2448 kg per day, based on scaled measured proto model release rate. This would require about 10 square meters of area within the stack (the entire surface area of such a stack is about 90 square meters).

The invention will now be further described as A FIRST EXEMPLARY EMBODIMENT of a METHOD for mitigating carbon dioxide emission of a carbon dioxide-producing activity in accordance with the present invention, including the steps of providing apparatus as set forth in claim 1; supplying $CO_2$ from a $CO_2$-rich fluid to the matrix by diffusion through the first membrane; collecting oxygen by diffusion through the second membrane; recovering carbon from the substrate; regenerating the active material from the matrix; and reconstituting the matrix comprising the regenerated active material.

The $CO_2$ rich fluid can be a waste gas mixture from a fossil fuel-fired power generator. Such a gas mixture is delivered to the first membrane via pipes or the like and is allowed to loiter at the first membrane, whereupon the carbon dioxide it contains diffuses into the matrix.

In the matrix, the carbon dioxide reacts with the active material. Where the active material is dodeca tungsto phosphoric acid, the reaction products include diatomic oxygen, reduced tungsten and reduced carbon.

Oxygen diffuses through the matrix and exits via the second membrane, whereupon it is collected by a pipe or the like.

Carbon is recovered as a solid from the matrix. Carbon is separated from tungsten and other components by mechanically removing the residue using forced air, an ablating tool such as an ultrasound or laser heating element and magnetic collector, or using a heating element underneath the grid, and a scouring fluid rinse.

In this exemplary method, Tungsten is reintroduced with hydrochloric acid and then phosphoric acid, and reheated to 100° C. to remove water.

To reconstitute the matrix containing the active material, tungsten and tungsten oxide residue are mixed with small amounts of acidified water, having small fractions of hydrochloric, and then phosphoric acid, and re-crystallized using added energy, which may be supplied as heat. Water and phosphate are introduced to the material gradually over a period of 2 weeks to 4 weeks (slow addition reduces crumbling). TEOS and dodeca tungsto phosphoric acid do not decompose at operating temperatures of 95-110° C.

The chemistry underlying exemplary embodiments of the present invention may be described as follows:

$$3\,CO_2 + 1\,H_3PW_{12}O_{40} \longrightarrow 3\,HCO_3^- + (PW_{12}O_{37})^{+3} \quad (1)$$

$$3\,HCO_3^- + 1\,(PW_{12}O_{37})^{+3} + 4\,NaOH \longrightarrow$$
$$1\,PO_4^{-3} + 1\,(W_{12}O_{37})^{-2} + 3\,CO_3^{-2} + 7\,H^+ + 4\,Na^+ \quad (2)$$

$$1\,PO_4^{-3} + 1\,(W_{12}O_{37})^{-2} + 3\,CO_3^{-2} + 7\,H^+ + 4\,Na^+ \longrightarrow$$
$$1\,PO_4^{-3} + 1(W_{12}O_{37})^{-2} + 3\,HCO_3^- + 4\,H^+ + 4\,Na^+ \quad (3)$$

$$1(W_{12}O_{37})^{-2} + 1PO_4^{-3} + 3HCO_3^- + 4H^+ +$$
$$4Na^+ \xrightarrow{APl\_ATl} 12\,W_s + Na_3PO_4 +$$
$$3H_2CO_3 + NaOH + 18\,O_2 \quad (4)$$

For solid carbon and residue:

$$12\,W_s + Na_3PO_4 + 3H_2CO_3 + NaOH + 18\,O_2 \xrightarrow{\Delta H}$$
$$12\,Ws + 4Na_s + Ps + 3Cs + 7/2\,H_2 + 32\,O_2 \quad (5)$$

And for the regeneration process, we have $$2\,KNO_3^- + 2\,Ss \xrightarrow{\Delta H} 2\,SO_3 + 2K + N_2 \quad (5)$$
$$2\,SO_3 + 2\,H_2O \longrightarrow 2\,H_2SO_4$$

Saltpeter and Sulfur are relatively inexpensive $$Fe_3(PO_4)_2 + 3H_2SO_4 \rightarrow 2H_3PO_4 + 3FeSO_4S \text{ (also known as vivianite)} \quad (6)$$

$$3\,FeSO_4 + NaCl + H_2O \longrightarrow$$
$$HCl + 3\,FeSO_4 + NaOH \text{ (One example to make HCl)} \quad (7)$$

$$24\,Ws + 2\,H_3PO_4 + HCl \xrightarrow{\Delta H} 2\,H_3PW_{12}O_{40} \quad (8)$$

In a variation upon this FIRST EXEMPLARY EMBODIMENT of the METHOD, the apparatus is provided as set forth above in the electrically connected variation of the first and second exemplary embodiments of the apparatus and steps are taken to utilize or store electrical energy collected via the electric circuit that is connected to the two membranes.

In another variation, the step of supplying energy includes a step of heating, which may be accomplished, for example, with IR or visible light.

In another variation, the step of supplying energy includes a step of heating after the step of recovering carbon.

In another variation, the step of supplying energy is accomplished at least in part with energy captured from the matrix after the step of supplying carbon dioxide.

In another variation, the step of supplying energy is accomplished at least in part with energy derived from collection of sunlight.

When fed with a waste gas emitted from combustion of a carbon-rich fuel, sustainability of the method requires larger amounts of energy derived from sunlight or other external sources. When fed with a waste gas emitted from combustion of a low-carbon fuel, sustainability of the method requires smaller amounts of energy derived from sunlight or other external sources. With reference to the various embodiments of the present invention, the following equations serve to describe the chemistry that takes place:

As can be seen from the drawing figures and from the description, each embodiment of the device in accordance with the present invention solves a problem by addressing the need for removal of carbon dioxide and supplying consumables—in some embodiments, without introducing additional raw materials, but instead drawing from the broken down materials from the reaction.

While the specification describes particular embodiments of the present invention, those of ordinary skill can devise variations of the present invention without departing from the inventive concept.

Although specific embodiments have been illustrated and described herein, those of ordinary skill in the art will appreciate that any arrangement calculated to achieve same purposes can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

In the foregoing description, if various features are grouped together in a single embodiment for the purpose of streamlining the disclosure, this method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims, and such other claims as may later be added, are hereby incorporated into the description of the embodiments of the invention, with each claim standing on its own as a separate preferred embodiment.

I claim:

1. Apparatus for mitigating carbon dioxide emission of a carbon dioxide-producing activity, said apparatus comprising:
   a rectangular frame having spaced-apart opposing first and second sides, spaced-apart opposing first and second ends, and spaced-apart opposing first and second edges;
   a first membrane sealingly contacting said first edge and spanning said frame from side to side and from end to end, said first membrane being permeable to carbon dioxide;
   a second membrane sealingly contacting said second edge and spanning said frame from side to side and from end to end, said second membrane being permeable to oxygen;
   a webbing disposed in said frame between said first membrane and said second membrane;
   a porous matrix adherent to said webbing, said matrix containing water, said matrix being permeable to water and to gases dissolved therein; and an active material included in said matrix, said active material being capable of reacting with carbon dioxide to form oxygen and carbon, said first membrane and said second membrane being capable of physically confining said matrix.

2. Apparatus of claim 1, wherein said frame and said webbing are electrically insulating and said first membrane and said second membrane are electrically conductive and are electrically connected to respective first and second poles of an electric circuit for collecting electrical energy from the apparatus.

3. Apparatus of claim 1, wherein said matrix comprises an aerogel, low viscosity polymer, metal oxide, or clay mineral.

4. Apparatus of claim 1, wherein said first membrane comprises a zeolite, clay mineral, amorphous polymer, or aggregate metal granules.

5. Apparatus of claim 1, wherein said second membrane comprises a zeolite, clay mineral, amorphous polymer, or aggregate metal granules.

6. Apparatus of claim 1, wherein said active material comprises dodeca tungsto phosphoric acid.

7. A method of mitigating carbon dioxide emission of a carbon dioxide-producing activity, said method including the steps of: providing apparatus as set forth in claim 1; supplying $CO_2$ from a $CO_2$-rich fluid to said matrix by diffusion through said first membrane; collecting oxygen by diffusion through said second membrane; recovering carbon from said matrix; regenerating said active material from said matrix; and reconstituting said matrix comprising said regenerated active material;
   said step of introducing of supplying $CO_2$ causing a drop in mixture pH;
   said step of pH drop generating a measured amount of heat;
   a step of supplying energy being accomplished at least in part with energy captured from said matrix after said step of supplying carbon dioxide.

* * * * *